US012749903B2

(12) United States Patent
Xiao et al.

(10) Patent No.: US 12,749,903 B2
(45) Date of Patent: Sep. 29, 2026

(54) PHOTOVOLTAIC ENERGY STORAGE SYSTEM, POWER SYSTEM, AND HIGH-VOLTAGE RIDE-THROUGH CONTROL METHOD

(71) Applicant: HUAWEI DIGITAL POWER TECHNOLOGIES CO., LTD., Shenzhen (CN)

(72) Inventors: Gang Xiao, Shenzhen (CN); Zhiqing Wu, Shenzhen (CN); Rong Wu, Shenzhen (CN); Lin Zhu, Xi'an (CN); Shaohui Zhong, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 552 days.

(21) Appl. No.: 18/495,084

(22) Filed: Oct. 26, 2023

(65) Prior Publication Data

US 2024/0063654 A1 Feb. 22, 2024

Related U.S. Application Data

(63) Continuation of application No. PCT/CN2021/091257, filed on Apr. 30, 2021.

(51) Int. Cl.

*H02J 7/00* (2026.01)
*H02J 3/32* (2006.01)

(Continued)

(52) U.S. Cl.

CPC .................. *H02J 7/35* (2013.01); *H02J 3/32* (2013.01); *H02J 3/38* (2013.01); *H02J 2101/24* (2026.01); *H02J 2207/20* (2020.01)

(58) Field of Classification Search

CPC ........ H02J 7/35; H02J 3/32; H02J 3/38; H02J 2101/24; H02J 2207/20

(Continued)

(56) References Cited

U.S. PATENT DOCUMENTS 10,630,079 B2 * 4/2020 Nelson .................... F03D 9/255
2021/0126671 A1 4/2021 Gao et al.

FOREIGN PATENT DOCUMENTS

CN 104300574 A 1/2015
CN 107017662 A 8/2017

(Continued)

OTHER PUBLICATIONS

B. R. Naidu, P. Bajpai and C. Chakraborty, "Voltage Fault Ride-Through Operation of Solar PV Units: A Review and Way Forward," 2019 8th International Conference on Power Systems (ICPS), Jaipur, India, 2019, pp. 1-6, doi: 10.1109/ICPS48983.2019.9067604. (Year: 2019).*

(Continued)

*Primary Examiner* — Zixuan Zhou
(74) *Attorney, Agent, or Firm* — Fish & Richardson P.C.

(57) ABSTRACT

This application describes examples of a photovoltaic energy storage system including an inverter and an energy storage device. In one example, an input end of the inverter is connected to a direct current bus. An output end of the inverter is connected to an alternating current power grid. The energy storage device is connected to the direct current bus. The inverter is configured to send high-voltage ride-through information to the energy storage device when a high-voltage ride-through occurs in the alternating current power grid. The energy storage device is configured to: when the high-voltage ride-through information is received, adjust an output voltage reference value to maintain a discharging working state if the energy storage device is in the discharging working state, or adjust a charging power reference value to maintain a charging working state if the energy storage device is in the charging working state.

14 Claims, 5 Drawing Sheets

(51) Int. Cl.
*H02J 3/38* (2006.01)
*H02J 7/35* (2006.01)
*H02J 101/24* (2026.01)

(58) Field of Classification Search
USPC .......................................................... 320/101
See application file for complete search history.

(56) References Cited

FOREIGN PATENT DOCUMENTS

| | | | | |
|---|---|---|---|---|
| CN | 107181278 A | 9/2017 | | |
| CN | 108092601 A | 5/2018 | | |
| CN | 110994628 A | 4/2020 | | |
| EP | 3800793 A1 * | 4/2021 | ............... | H04B 3/32 |

OTHER PUBLICATIONS

EP Communication Pursuant to Article 94(3) EPC in Europe Appln. No. 21938434.4, mailed on May 27, 2025, 5 pages.

* cited by examiner

PHOTOVOLTAIC ENERGY STORAGE SYSTEM, POWER SYSTEM, AND HIGH-VOLTAGE RIDE-THROUGH CONTROL METHOD

CROSS-REFERENCE TO RELATED APPLICATIONS

This application is a continuation of International Application No. PCT/CN2021/091257, filed on Apr. 30, 2021, the disclosure of which is hereby incorporated by reference in its entirety.

TECHNICAL FIELD

This application relates to the field of photovoltaic power generation technologies, and in particular, to a photovoltaic energy storage system, a power system, and a high-voltage ride-through control method.

BACKGROUND

Currently, photovoltaic power generation, wind power generation, and hydroelectric power generation are increasingly valued. For example, photovoltaic power generation is to convert solar energy into electrical energy. In photovoltaic power generation, power generation and energy storage are currently combined for use, that is, forming a photovoltaic energy storage system.

The photovoltaic energy storage system usually includes a photovoltaic array, a direct current/direct current (DC/DC, Direct Current/Direct Current) converter, an inverter (DC/AC, Direct Current/alternating Current), and an energy storage device. An output end of the DC/DC converter is connected to a direct current bus, an input end of the inverter is connected to the direct current bus, the energy storage device is connected to the direct current bus, and an output end of the inverter is connected to an alternating current power grid.

During actual operation, the alternating current power grid is prone to high-voltage ride-through. Because the input end of the inverter is connected to the direct current bus, and the direct current bus is further connected to the energy storage device, a high voltage at the output end of the inverter affects a direct current bus voltage. Therefore, how to control a working status of the energy storage device when high-voltage ride-through occurs in the photovoltaic energy storage system is a technical problem that needs to be resolved by persons skilled in the art.

SUMMARY

This application provides a photovoltaic energy storage system, a power system, and a control method, to control an energy storage device to work properly when high-voltage ride-through occurs in an alternating current power grid.

An embodiment of this application provides a photovoltaic energy storage system. The photovoltaic energy storage system is used in a photovoltaic power generation scenario in which an energy storage device is configured, that is, a scenario in which an inverter and an energy storage device are included. An input end of the inverter is configured to connect to a direct current bus. An output end of the inverter is configured to connect to an alternating current power grid. The direct current bus is connected to a photovoltaic string. The photovoltaic string provides a direct current to the direct current bus. The energy storage device is configured to connect to the direct current bus. The energy storage device can not only absorb energy from the direct current bus to charge itself, but also release energy to the direct current bus to implement an electrical discharge. The inverter sends high-voltage ride-through information to the energy storage device when high-voltage ride-through occurs in the alternating current power grid. The energy storage device takes a measure based on its working status when receiving the high-voltage ride-through information. Specifically, if being in a discharging working state, the energy storage device adjusts an output voltage reference value to maintain the discharging working state, or if being in a charging working state, the energy storage device adjusts a charging power reference value to maintain the charging working state.

In the photovoltaic energy storage system provided in this embodiment of this application, the inverter is used to determine whether high-voltage ride-through occurs in the alternating current power grid. When determining that high-voltage ride-through occurs in the alternating current power grid, the inverter notifies the energy storage device, so that the energy storage device takes a corresponding measure. If the energy storage device is in the discharging working state, the energy storage device adjusts the output voltage reference value to maintain the discharging working state, to avoid an energy backflow to the energy storage device from a high voltage that fluctuates on the direct current bus. If the energy storage device is in the charging working state, the energy storage device adjusts the charging power reference value to maintain the charging working state, so that the inverter can control a grid-tied current to meet a requirement in a standard that corresponds to a power grid undergoing high-voltage ride-through. In the photovoltaic energy storage system provided in this embodiment of this application, when high-voltage ride-through occurs in the alternating current power grid, the energy storage device is controlled to maintain an original working state. This avoids damage to the device that results from frequency switchovers between working states performed by the energy storage device due to high-voltage ride-through. If the energy storage device is used to identify high-voltage ride-through, the energy storage device usually determines, based on a direct current bus voltage, whether high-voltage ride-through occurs. However, when high-voltage ride-through occurs in the alternating current power grid, a rise in the direct current bus voltage is related to magnitude of capacitance of the direct current bus. Therefore, based on a rise in the direct current bus voltage, the energy storage device cannot accurately determine whether high-voltage ride-through occurs. In this embodiment of this application, use of the inverter to identify high-voltage ride-through can help more accurately determine a moment at which high-voltage ride-through occurs.

In a possible implementation, the energy storage device includes a controller, a power conversion circuit, and a battery pack. A first end of the power conversion circuit is connected to the battery pack, and a second end of the power conversion circuit is connected to the direct current bus.

The controller is configured to: when the high-voltage ride-through information is received and the battery pack is in the discharging working state, control the energy storage device to output energy to the direct current bus, and control the power conversion circuit to raise the output voltage reference value of the energy storage device above a peak voltage of high-voltage ride-through, so that the energy storage device remains in the discharging working state. In this way, the direct current bus voltage can be quickly raised, so that the discharging working state is maintained. This avoids a case in which a current flows back into the energy storage device due to the quite high direct current bus voltage and the battery pack in the energy storage device is consequently charged. The energy storage device raises the direct current bus voltage for the following purposes: to enable the energy storage device to maintain the discharging working state and not to frequently switch between the discharging working state and the charging working state, and to enable the inverter to output a power according to the requirement in the standard when high-voltage ride-through occurs. The controller is further configured to: when the high-voltage ride-through information is received and the battery pack is in the charging working state, adjust the charging power reference value of the energy storage device to a charging power that applies before high-voltage ride-through occurs, so that the energy storage device remains in the charging working state. If the energy storage device changes the working status when high-voltage ride-through occurs in the alternating current power grid, it affects the inverter controlling the grid-tied current, resulting in failure to smoothly undergo high-voltage ride-through. In addition, normal operation of the energy storage device and the inverter is affected, and in a worst case, damage to a hardware device may be caused.

In a possible implementation, the inverter is specifically configured to encode the high-voltage ride-through information into a pulse signal, and send the pulse signal to a first interface of the energy storage device through an I/O port of the inverter. The high-voltage ride-through information sent by the inverter to the energy storage device may be a level-coded signal. For example, the high-voltage ride-through information is encoded into a pulse signal, and the pulse signal is sent to the energy storage device. In addition, the high-voltage ride-through information may be alternatively encoded into a high/low-level signal, and the high/low-level signal is sent to the energy storage device. For example, the high-level signal indicates that high-voltage ride-through occurs.

In a possible implementation, for a purpose of saving a hardware I/O port of the inverter, an interface used by the inverter to send the high-voltage ride-through information and an interface used by the inverter to send a power-on signal share a same interface in this embodiment of this application. The photovoltaic energy storage system further includes an energy storage drive circuit. The inverter is further configured to send the power-on signal to a first interface of the energy storage drive circuit through the I/O port. The energy storage drive circuit is configured to drive the energy storage device to power on when the power-on signal is received.

In a possible implementation, to better isolate signal interference between the inverter and the energy storage device, the inverter provided in this embodiment includes a first optocoupler and a second optocoupler. A first input terminal of the first optocoupler is connected to the I/O port of the inverter. A first output terminal of the first optocoupler is connected to a power supply. A second output terminal of the first optocoupler is connected to the first interface of the energy storage device. A first input terminal of the second optocoupler is connected to the I/O port of the inverter. An output terminal of the second optocoupler is connected to the first interface of the energy storage drive circuit. A second input terminal of the first optocoupler and a second input terminal of the second optocoupler are both connected to a reference ground.

In a possible implementation, a direct current/direct current converter is further included. An input end of the direct current/direct current converter is configured to connect to the photovoltaic string. An output end of the direct current/direct current converter is configured to connect to the direct current bus. The direct current/direct current converter may convert an output voltage of the photovoltaic string into a voltage matching the direct current bus. A specific manner in which the direct current/direct current converter is implemented is not limited in this embodiment of this application. The direct current/direct current converter may be a boost circuit or a buck-boost circuit. In addition, a quantity of photovoltaic strings is not specifically limited in this embodiment of this application. Usually, the input end of the direct current/direct current converter is connected to a plurality of photovoltaic strings. A quantity of direct current/direct current converters connected to the direct current bus is not specifically limited either in this embodiment of this application. There may be a plurality of direct current/direct current converters.

In a possible implementation, the controller is specifically configured to control the output voltage reference value of the power conversion circuit to be a preset multiple of a rated voltage of the alternating current power grid, with a value interval of the preset multiple greater than 1.4 and less than 2.

Based on the photovoltaic energy storage system provided in the foregoing embodiment, advantages corresponding to the foregoing implementations of the photovoltaic energy storage system are also applicable to the following power system. Details are not described herein again. An embodiment of this application further provides a power system. The power system includes an inverter and an energy storage device. An input end of the inverter is connected to a direct current bus. An output end of the inverter is configured to connect to an alternating current power grid. The energy storage device is connected to the direct current bus. The inverter is configured to send high-voltage ride-through information to the energy storage device when high-voltage ride-through occurs in the alternating current power grid. The energy storage device is configured to: when the high-voltage ride-through information is received, adjust an output voltage reference value to maintain a discharging working state if the energy storage device is in the discharging working state, or adjust a charging power reference value to maintain a charging working state if the energy storage device is in the charging working state.

In a possible implementation, the inverter is specifically configured to encode the high-voltage ride-through information into a pulse signal, and send the pulse signal to a first interface of the energy storage device through an I/O port of the inverter.

In a possible implementation, the inverter is further configured to send a power-on signal to a second interface of the energy storage device through the I/O port, and the energy storage device is configured to power on when receiving the power-on signal.

In a possible implementation, the energy storage device includes a controller, a power conversion circuit, and a battery pack. A first end of the power conversion circuit is connected to the battery pack. A second end of the power conversion circuit is connected to the direct current bus. The controller is configured to: when the high-voltage ride-through information is received and the battery pack is in the discharging working state, control the power conversion circuit to raise the output voltage reference value of the energy storage device above a peak voltage of high-voltage ride-through, so that the energy storage device remains in the discharging working state; and is further configured to:

when the high-voltage ride-through information is received and the battery pack is in the charging working state, adjust the charging power reference value of the energy storage device to a charging power that applies before high-voltage ride-through occurs, so that the energy storage device remains in the charging working state.

In a possible implementation, the inverter includes a first optocoupler and a second optocoupler. A first input terminal of the first optocoupler is connected to the I/O port of the inverter. A first output terminal of the first optocoupler is connected to a power supply. A second output terminal of the first optocoupler is connected to the first interface of the energy storage device. A first input terminal of the second optocoupler is connected to the I/O port of the inverter. An output terminal of the second optocoupler is connected to the first interface of the energy storage drive circuit. A second input terminal of the first optocoupler and a second input terminal of the second optocoupler are both connected to a reference ground.

Based on the photovoltaic energy storage system provided in the foregoing embodiment, an embodiment of this application further provides a high-voltage ride-through control method. The high-voltage ride-through control method is applied to the photovoltaic energy storage system described in the foregoing embodiment. Advantages of the photovoltaic energy storage system provided in the foregoing embodiment are also applicable to the following method embodiment. Details are not described herein again. The photovoltaic energy storage system includes an inverter and an energy storage device. An input end of the inverter is configured to connect to a direct current bus. The energy storage device is configured to connect to the direct current bus. An output end of the inverter is configured to connect to an alternating current power grid. The method includes: receiving high-voltage ride-through information sent by the inverter, where the inverter is configured to determine whether high-voltage ride-through occurs in the alternating current power grid; and when the high-voltage ride-through information is received, adjusting an output voltage reference value to maintain a discharging working state if the energy storage device is in the discharging working state, or adjusting a charging power reference value to maintain a charging working state if the energy storage device is in the charging working state.

In a possible implementation, performing high-voltage ride-through based on a working status of the energy storage device specifically includes: when the high-voltage ride-through information is received and a battery pack is in the discharging working state, controlling a power conversion circuit to raise the output voltage reference value of the energy storage device above a peak voltage of high-voltage ride-through, so that the energy storage device remains in the discharging working state; or when the high-voltage ride-through information is received and a battery pack is in the charging working state, adjusting the charging power reference value of the energy storage device to a charging power that applies before high-voltage ride-through occurs, so that the energy storage device remains in the charging working state.

It can be learned from the foregoing technical solutions that the embodiments of this application have the following advantages.

In the embodiments of this application, the inverter is used to determine whether high-voltage ride-through occurs in the alternating current power grid. When high-voltage ride-through occurs in the alternating current power grid, the inverter needs to notify the energy storage device of occurrence of high-voltage ride-through, so that the energy storage device takes a high-voltage ride-through measure. If being in the discharging working state, the energy storage device adjusts the output voltage reference value to maintain the discharging working state. If being in the charging working state, the energy storage device adjusts the charging power reference value to maintain the charging working state, so that the inverter can control the grid-tied current to meet the requirement in the standard that corresponds to a power grid undergoing high-voltage ride-through. A conventional alternating current power grid does not have an energy storage device. Therefore, when high-voltage ride-through occurs in the alternating current power grid, a working status of an energy storage device does not need to be considered. In contrast, the photovoltaic energy storage system includes both the inverter and the energy storage device. The energy storage device is connected to the direct current bus. When high-voltage ride-through occurs, the direct current bus voltage is affected. Therefore, when high-voltage ride-through occurs in the alternating current power grid, the energy storage device needs to be notified in a timely manner. If the energy storage device is used to identify high-voltage ride-through, the energy storage device usually determines, based on the direct current bus voltage, whether high-voltage ride-through occurs. However, when high-voltage ride-through occurs in the alternating current power grid, a rise in the direct current bus voltage is related to magnitude of capacitance of the direct current bus. Therefore, based on a rise in the direct current bus voltage, the energy storage device cannot accurately determine whether high-voltage ride-through occurs. In the embodiments of this application, use of the inverter to identify high-voltage ride-through can help more accurately determine a moment at which high-voltage ride-through occurs.

DESCRIPTION OF EMBODIMENTS

Words such as "first" and "second" in the following description are merely intended for a purpose of description, and shall not be understood as an indication or implication of relative importance or implicit indication of a quantity of indicated technical features. Therefore, a feature limited by "first", "second", or the like may explicitly or implicitly indicate that one or more features are included. In the description of this application, "a plurality of" means two or more unless otherwise specified.

In addition, in this application, directional terms such as "up" and "down" may include but are not limited to directional terms that are defined relative to positions in which parts are schematically placed in the accompanying drawings. It should be understood that these directional terms may be relative concepts, are used to describe and clarify relativity, and may vary with positions in which parts are placed in the accompanying drawings.

In this application, unless expressly stated and limited otherwise, a term "connection" should be understood in a broad sense. For example, the "connection" may be a fixed connection, a detachable connection, an integration, a direct connection, or an indirect connection using an intermediate medium. In addition, a term "coupling" may be a manner of implementing an electrical connection for signal transmission. The "coupling" may be a direct electrical connection, or may be an indirect electrical connection using an intermediate medium.

An embodiment of this application relates to a photovoltaic energy storage system, which can not only perform photovoltaic power generation but also store energy. To enable persons skilled in the art to better understand the photovoltaic energy storage system provided in this embodiment of this application, the following provides descriptions with reference to the accompanying drawings.

Embodiment of a Photovoltaic Energy Storage System

Figure 1:
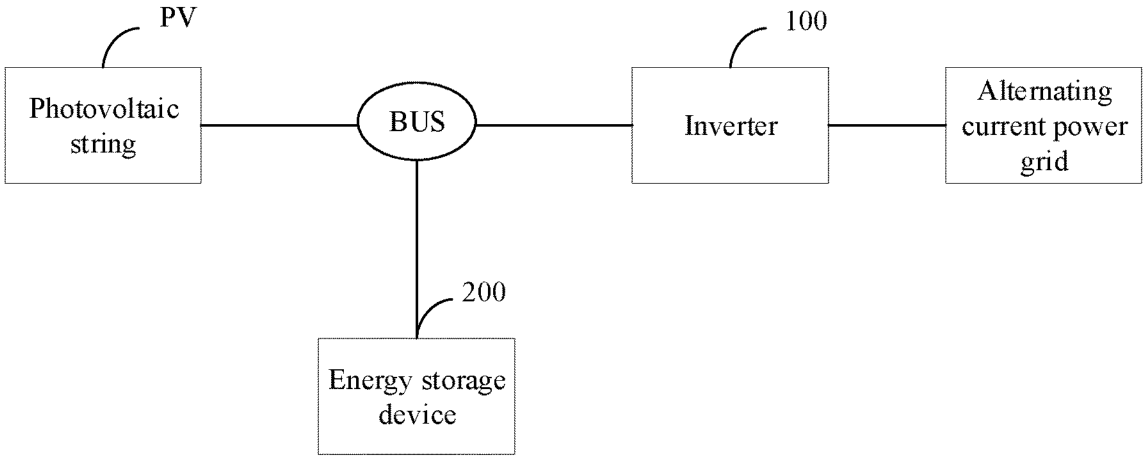
FIG. 1 is a schematic diagram of a photovoltaic energy storage system according to an embodiment of this application.

FIG. 1 is a schematic diagram of a photovoltaic energy storage system according to an embodiment of this application.

The photovoltaic energy storage system provided in this embodiment of this application includes an inverter 100 and an energy storage device 200, and may further include a photovoltaic string PV. FIG. 1 shows only a photovoltaic string PV as an example. An actual product usually includes a plurality of photovoltaic strings.

An input end of the inverter 100 is connected to a direct current bus (BUS). An output end of the inverter 100 is configured to connect to an alternating current power grid. The direct current bus (BUS) is configured to connect to the photovoltaic string PV. The direct current bus (BUS) may be directly or indirectly connected to the photovoltaic string PV.

Figure 2:
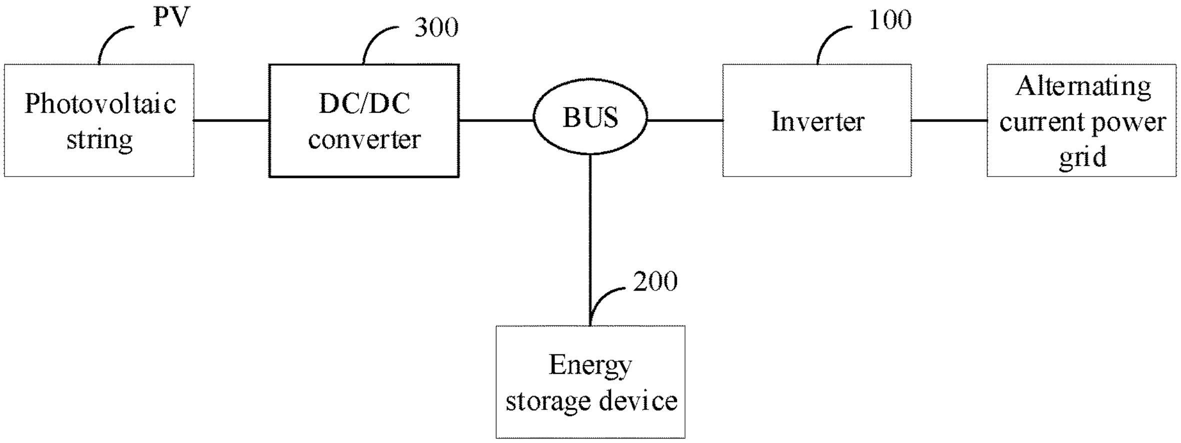
FIG. 2 is a schematic diagram of another photovoltaic energy storage system according to an embodiment of this application.

When the direct current bus (BUS) is indirectly connected to the photovoltaic string PV, the photovoltaic energy storage system provided in this embodiment of this application may further include a direct current/direct current (DC/DC, Direct Current/Direct Current) converter 300, as shown in FIG. 2. An input end of the DC/DC converter 300 is configured to connect to the photovoltaic string PV. An output end of the DC/DC converter 300 is connected to the direct current bus (BUS). A specific manner in which the DC/DC converter 300 is implemented is not limited in this embodiment of this application. For example, the DC/DC converter 300 may be a boost circuit or a buck-boost circuit. In addition, the DC/DC converter 300 may be alternatively integrated into a direct current combiner box. The DC/DC converter 300 is configured to perform direct current conversion on a voltage output by the PV, and then transmit an obtained voltage to the direct current bus (BUS).

The energy storage device 200 is connected to the direct current bus (BUS).

The inverter 100 is configured to send high-voltage ride-through information to the energy storage device 200 when high-voltage ride-through occurs in the alternating current power grid.

The inverter 100 may use a separate signal cable or share another hardware signal cable when sending the high-voltage ride-through information to the energy storage device 200. For example, the inverter 100 may share a power-on signal cable of the energy storage device 200. That is, after starting up, the inverter 100 needs to send a power-on signal to the energy storage device 200, to make the energy storage device 200 power on. When the high-voltage ride-through information shares the power-on signal cable, a hardware interface of the inverter 100 can be saved. An existing hardware interface of the inverter 100 is used, with no need to additionally provide a new hardware interface. The power-on signal is used to indicate the energy storage device 200 to power on, for example, to wake up.

In this embodiment of this application, the inverter is used to determine whether high-voltage ride-through occurs in the alternating current power grid. For example, in specific implementation, the inverter 100 may detect the voltage of the alternating current power grid in real time, and compare a detected voltage with a preset voltage threshold. When the detected voltage is greater than the preset voltage threshold, it indicates that high-voltage ride-through occurs in the alternating current power grid. In this case, the inverter 100 needs to notify the energy storage device 200 of occurrence of high-voltage ride-through, so that the energy storage device 200 takes a high-voltage ride-through measure, and further the inverter can control a grid-tied current to meet a requirement that corresponds to high-voltage ride-through.

A conventional alternating current power grid does not have an energy storage device. Therefore, when high-voltage ride-through occurs in the alternating current power grid, a working status of an energy storage device does not need to be considered. In contrast, the photovoltaic energy storage system includes both the inverter and the energy storage device. Therefore, when high-voltage ride-through occurs in the alternating current power grid, the energy storage device 200 needs to be notified in a timely manner. If the energy storage device 200 is used to identify high-voltage ride-through, the energy storage device 200 usually determines, based on a direct current bus voltage, whether high-voltage ride-through occurs. However, when high-voltage ride-through occurs in the alternating current power grid, a rise in the direct current bus voltage is related to magnitude of capacitance of the direct current bus. Therefore, based on a rise in the direct current bus voltage, the energy storage device 200 cannot accurately determine whether high-voltage ride-through occurs.

The energy storage device 200 is configured to: when the high-voltage ride-through information is received, adjust an output voltage reference value to maintain a discharging working state, that is, continue releasing energy to the direct current bus, if the energy storage device is in the discharging working state; or adjust a charging power reference value to maintain a charging working state, that is, continue absorbing energy from the direct current bus, if the energy storage device is in the charging working state.

When high-voltage ride-through occurs, the energy storage device 200 may take a corresponding measure based on its working status. For example, when being in the discharging working state, the energy storage device 200 may raise the direct current bus voltage quickly to maintain the discharging working state. This avoids a case in which a current flows back into the energy storage device 200 due to the quite high direct current bus voltage and a battery pack in the energy storage device is consequently charged. The energy storage device 200 raises the direct current bus voltage for the following purposes: to enable the energy storage device 200 to maintain the discharging working state and not to frequently switch between the discharging working state and the charging working state, and to enable the inverter to output a power according to a requirement in a standard when high-voltage ride-through occurs. Specifically, the energy storage device 200 may indirectly raise the direct current bus voltage by raising an output voltage. In addition, if the energy storage device 200 is in the charging working state when high-voltage ride-through occurs, the charging power reference value of the energy storage device 200 needs to be adjusted, so that the energy storage device 200 maintains the charging working state. If the energy storage device 200 changes the working status when high-voltage ride-through occurs in the alternating current power grid, it affects the inverter 100 controlling the grid-tied current, resulting in failure to smoothly undergo high-voltage ride-through. In addition, normal operation of the energy storage device 200 and the inverter 100 is affected, and in a worst case, damage to a hardware device may be caused.

In the photovoltaic energy storage system provided in this embodiment of this application, the inverter is used to determine whether high-voltage ride-through occurs in the alternating current power grid. When high-voltage ride-through occurs in the alternating current power grid, the inverter sends the high-voltage ride-through information to the energy storage device to notify the energy storage device of occurrence of high-voltage ride-through, so that the energy storage device takes a corresponding measure based on its working status. If being in the discharging working state, the energy storage device adjusts the output voltage reference value to maintain the discharging working state. If being in the charging working state, the energy storage device adjusts the charging power reference value to maintain the charging working state. In this embodiment of this application, a manner is not used in which the energy storage device is used to identify high-voltage ride-through and then takes a corresponding measure. This is because the energy storage device cannot accurately determine whether high-voltage ride-through occurs. If high-voltage ride-through occurs but the energy storage device fails to identify it in a timely manner, a high voltage charges the energy storage device in a form of a pulsating current. As a result, the inverter cannot precisely control the grid-tied current, and cannot meet a grid tying requirement of the alternating current power grid.

With reference to an accompanying drawing, the following describes in detail a specific implementation in which the inverter sends the high-voltage ride-through information to the energy storage device in the photovoltaic energy storage system provided in this embodiment of this application.

Figure 3:
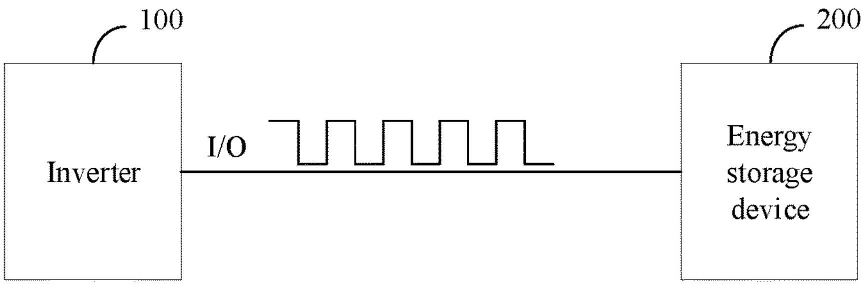
FIG. 3 is a schematic diagram of still another photovoltaic energy storage system according to an embodiment of this application.

FIG. 3 is a schematic diagram of a connection between an inverter and an energy storage device according to an embodiment of this application.

The high-voltage ride-through information sent by the inverter 100 to the energy storage device 200 may be a level-coded signal. For example, the high-voltage ride-through information is encoded into a pulse signal, and the pulse signal is sent to the energy storage device 200. In addition, the high-voltage ride-through information may be alternatively encoded into a high/low-level signal, and the high/low-level signal is sent to the energy storage device 200. For example, the high-level signal indicates that high-voltage ride-through occurs. In this embodiment, an example in which the high-voltage ride-through information is a pulse signal is used for description.

In this embodiment, the inverter 100 is specifically configured to encode the high-voltage ride-through information into a pulse signal, and send the pulse signal to an interface of the energy storage device 200 through an I/O port of the inverter 100.

When sending the encoded high-voltage ride-through information to the energy storage device 200, the inverter 100 may use an existing communication interface between the inverter 100 and the energy storage device 200, that is, reuse the existing interface. Alternatively, a communication interface may be separately provided.

Figure 4:
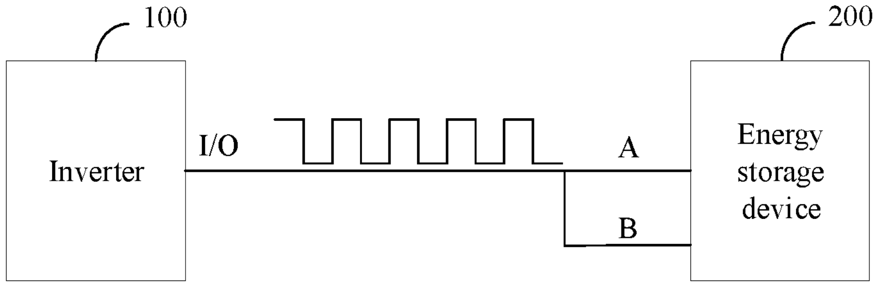
FIG. 4 is a schematic diagram of yet another photovoltaic energy storage system according to an embodiment of this application.

With reference to FIG. 4, the following describes an implementation in which the inverter reuses the existing interface.

FIG. 4 is a schematic diagram of another connection between an inverter and an energy storage device according to an embodiment of this application.

In addition, for a purpose of saving a hardware interface of the inverter 100, an interface used by the inverter 100 to send the high-voltage ride-through information may share an interface used to send the power-on signal to the energy storage device 200 in the inverter 100. However, two different interfaces of the energy storage device 200 may be both connected to a same I/O port of the inverter 100.

The inverter 100 is further configured to send the power-on signal to a second interface B of the energy storage device 200 through the I/O port.

The energy storage device 200 is configured to power on when receiving the power-on signal.

In this embodiment, the energy storage device 200 receives the power-on signal and the high-voltage ride-through information from different interfaces, which are a first interface A and the second interface B, respectively. Therefore, the energy storage device 200 can determine, based on an interface and a signal class, whether a signal from the inverter 100 is the power-on signal or the high-voltage ride-through information. In addition, in a possible implementation, the energy storage device 200 may alternatively receive the power-on signal and the high-voltage ride-through information from a same interface, provided that the power-on signal and the high-voltage ride-through information are of different signal classes. For example, the power-on signal and the high-voltage ride-through information are both square wave signals, but correspond to different frequencies of square wave signals. For example, the power-on signal is a 100 Hz square wave signal, whereas the high-voltage ride-through information is a 200 Hz square wave signal. In addition, it may alternatively be that the power-on signal is a pulse signal, whereas the high-voltage ride-through information is a high-level signal.

The first interface A and the second interface B of the energy storage device 200 are both connected to the I/O port of the inverter 100. That is, the I/O port of the inverter 100 is configured to send both the power-on signal and the high-voltage ride-through information, but the power-on signal and the high-voltage ride-through information are in different signal formats. Therefore, the first interface A and the second interface B of the energy storage device 200 can respectively identify received signals, determining whether a received signal is the power-on signal or the high-voltage ride-through information. When a received signal is the high-voltage ride-through information, the energy storage device 200 takes a high-voltage ride-through measure based on whether the energy storage device 200 is in the charging working state or the discharging working state.

In the foregoing embodiment, the following is described: The energy storage device is connected to the same I/O port of the inverter using two different interfaces. It should be understood that the energy storage device may be alternatively connected to the I/O port of the inverter using only one interface. The energy storage device determines, based on a format of a signal sent by the inverter, whether the signal is a high-voltage ride-through information or the power-on signal.

With reference to an accompanying drawing, the following describes specific measures that the energy storage device takes when high-voltage ride-through occurs.

Figure 5:
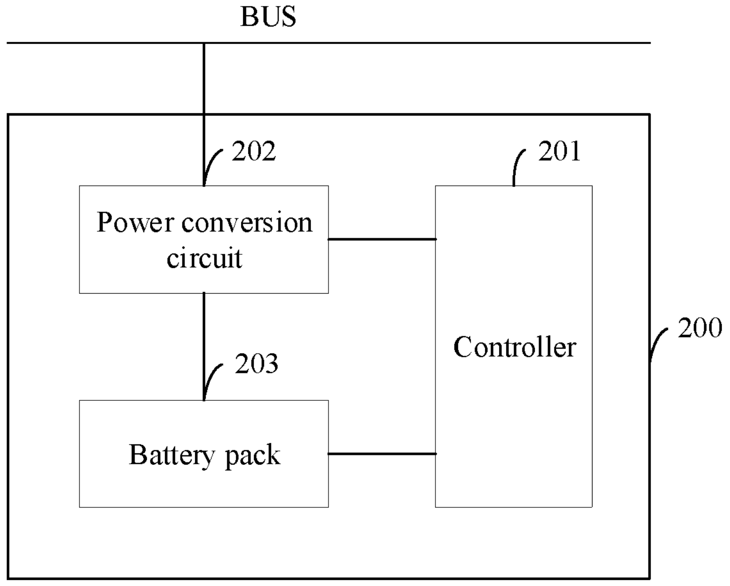
FIG. 5 is a diagram of an internal architecture of an energy storage device according to an embodiment of this application.

FIG. 5 is a diagram of an internal architecture of an energy storage device according to an embodiment of this application.

The energy storage device provided in this embodiment of this application includes a controller 201, a power conversion circuit 202, and the battery pack 203.

A first end of the power conversion circuit 202 is connected to the battery pack 203. A second end of the power conversion circuit 202 is connected to the direct current bus (BUS). That is, when the energy storage device discharges, an output voltage of the power conversion circuit 202 is the direct current bus voltage. Because the output end of the power conversion circuit 202 is connected to the direct current bus, the output voltage of the power conversion circuit 202 is the same as the direct current bus voltage.

The controller 201 is configured to: when the high-voltage ride-through information is received and the battery pack 203 is in the discharging working state, control the power conversion circuit 202 to raise the output voltage reference value of the energy storage device above a peak voltage of high-voltage ride-through, so that the energy storage device 200 remains in the discharging working state; and is further configured to: when the high-voltage ride-through information is received and the battery pack 203 is in the charging working state, adjust the charging power reference value of the energy storage device to a charging power that applies before high-voltage ride-through occurs, so that the energy storage device 200 maintains the charging working state.

The power conversion circuit 202 in this embodiment of this application may be a bidirectional DC/DC circuit, that is, meets a charging state and a discharging state of the battery pack 203. The power conversion circuit 202 may be a boost circuit or a buck-boost circuit. This is not specifically limited in this embodiment of this application.

For example, when high-voltage ride-through occurs in the alternating current power grid in a case in which the energy storage device 200 is in the discharging working state, the direct current bus (BUS) voltage is high, and the current likely flows back into the energy storage device 200. Therefore, to maintain the discharging working state of the energy storage device 200, the energy storage device 200 needs to raise its output voltage reference value. In this way, the direct current bus (BUS) voltage can be raised. For example, the controller 201 receives the high-voltage ride-through information sent by the inverter 100; the controller 201 controls the power conversion circuit 202 to raise the output voltage; and the power conversion circuit 202 raises a voltage of the battery pack 203 and then outputs the voltage to the direct current bus (BUS). For a purpose of ensuring that the current on the direct current bus does not flow back into the energy storage device 200, the direct current bus voltage may be raised above the peak voltage of high-voltage ride-through as required in the standard, for example, above 1.4 times a peak rated voltage. In a possible implementation, the output voltage of the power conversion circuit is controlled to be a preset multiple of a rated voltage of the alternating current power grid, with a value interval of the preset multiple greater than 1.4 and less than 2. The preset multiple may be specifically determined based on a requirement in a standard corresponding to a power grid. The rated voltage is the rated voltage of the alternating current power grid. It should be understood that different power grid environments may correspond to different standards. When high-voltage ride-through occurs, the direct current bus voltage needs to be raised above the peak voltage of high-voltage ride-through as required in the standard.

When high-voltage ride-through occurs in the alternating current power grid in a case in which the energy storage device 200 is in the charging working state, the energy storage device 200 needs to adjust the charging power reference value of the energy storage device to the charging power that applies before high-voltage ride-through occurs, that is, ensure that a charging power is the same as the charging power that applies before high-voltage ride-through occurs. When the energy storage device 200 is in the charging working state, the inverter charges the battery pack 203 in the energy storage device 200. However, a charging power that the inverter can provide may be greater or less than a power required by the energy storage device 200.

When the charging power that the inverter can provide is greater than the power required by the energy storage device 200, the inverter can meet a charging requirement of the energy storage device 200. In this case, a voltage control loop of the energy storage device 200 does not work, and a power control loop controls charging.

When the charging power that the inverter can provide is less than the power required by the energy storage device 200, a voltage of the energy storage device 200 does not rise, and the charging power provided by the inverter is all absorbed by the energy storage device 200. In this case, the voltage control loop of the energy storage device 200 works. The voltage control loop of the energy storage device 200 may control the direct current bus (BUS) voltage.

With reference to an accompanying drawing, the following describes a specific implementation in which the inverter uses the same I/O port when sending the high-voltage ride-through information and the power-on signal.

Figure 6:
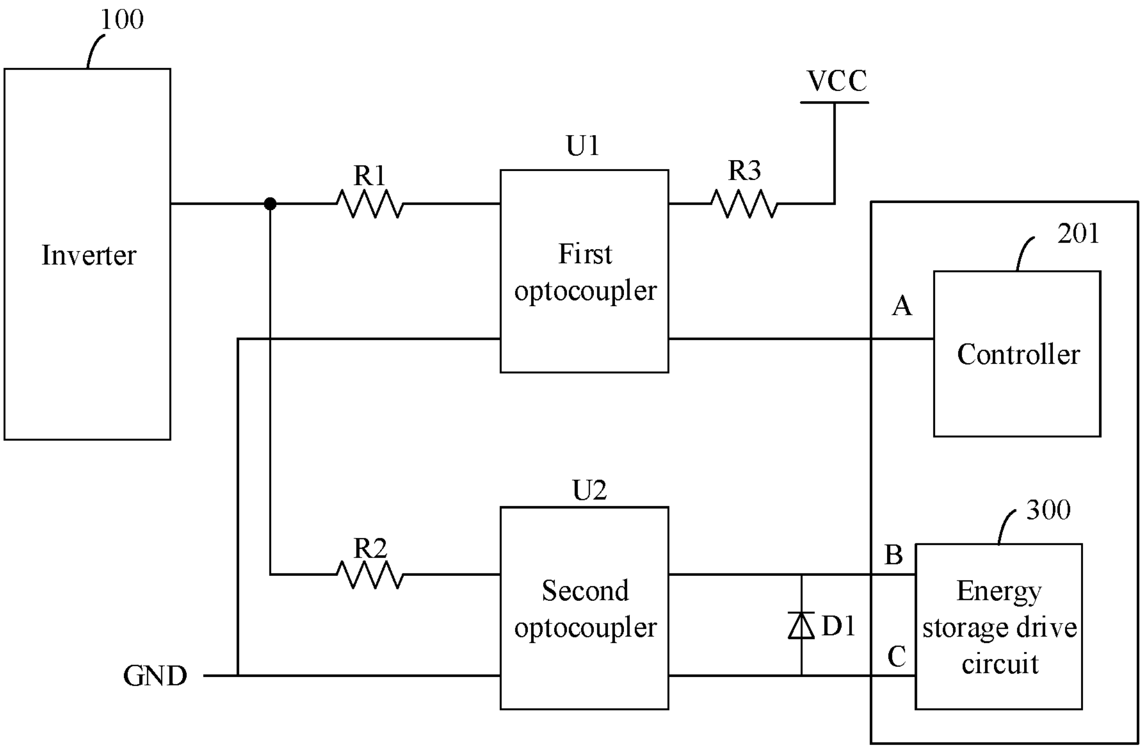
FIG. 6 is a schematic diagram of yet another connection between an inverter and an energy storage device according to an embodiment of this application.

FIG. 6 is a schematic diagram of yet another connection between an inverter and an energy storage device according to an embodiment of this application.

In the photovoltaic energy storage system provided in this embodiment, the inverter includes a first optocoupler U1 and a second optocoupler U2.

A first input terminal of the first optocoupler U1 is connected to the I/O port of the inverter 100. A second output terminal of the first optocoupler U1 is connected to a first interface A of the controller 201. A first output terminal of the first optocoupler U1 is connected to a power supply VCC via a third resistor R3. For example, the VCC is 3.3 V.

A first input terminal of the second optocoupler U2 is connected to the I/O port of the inverter 100. A first output terminal of the second optocoupler U2 is connected to a first interface B of an energy storage drive circuit 300. A second output terminal of the second optocoupler U2 is connected to a second interface C of the energy storage drive circuit 300. When receiving the power-on signal, the energy storage drive circuit 300 drives the energy storage device to power on.

A second input terminal of the first optocoupler U1 and a second input terminal of the second optocoupler U2 are both connected to a reference potential ground GND. It should be understood that the input terminals and the output terminals of each optocoupler correspond to different grounds, implementing electrical isolation, and avoiding interference caused by signals at the input terminals of the optocoupler to signals at the output terminals of the optocoupler.

In addition, the photovoltaic energy storage system provided in this embodiment further includes a first resistor R1, a second resistor R2, and the third resistor R3. The first input terminal of the first optocoupler U1 is connected to the I/O port of the inverter 100 via the first resistor R1. Likewise, the first input terminal of the second optocoupler U2 is connected to the I/O port of the inverter 100 via the second resistor R2. That is, the first input terminal of the first optocoupler U1 and the first input terminal of the second optocoupler U2 are both connected to the I/O port of the inverter 100. However, the output terminals of the two optocouplers are connected to different input ends of the energy storage device.

In a possible implementation, the two optocouplers and peripheral resistors and diodes described above may be integrated with the inverter 100, that is, integrated in a cabinet housing the inverter 100. The controller 201 and the energy storage drive circuit 300 are located on a side of the energy storage device, for example, may be located in an energy storage container.

When the I/O port of the inverter 100 outputs a high level, the first input terminal of the first optocoupler U1 is at a high level. In this case, the first optocoupler U1 is conducted, that is, the first output terminal and the second output terminal of the first optocoupler U1 are connected. Further, the first interface A of the controller 201 and the VCC are connected, and the first interface A receives a high-level signal. However, the first output terminal of the second optocoupler U2 is connected to the first interface B of the energy storage drive circuit 300, and the second output terminal of the second optocoupler U2 is connected to the second interface C of the energy storage drive circuit 300. Therefore, when the I/O port of the inverter 100 outputs a high level, the second optocoupler U2 is conducted. In this case, the first output terminal and the second output terminal of the second optocoupler U2 are connected.

It can be learned from the foregoing analysis that although the first input terminal of the first optocoupler U1 and the first input terminal of the second optocoupler U2 are both connected to the same I/O port of the inverter 100, the first optocoupler U1 and the second optocoupler U2 output different signals when the I/O port of the inverter 100 outputs a high level. Therefore, the controller 201 and the first interface B of the energy storage drive circuit 300 can determine whether the inverter 100 sends a power-on signal or high-voltage ride-through information.

To enable persons skilled in the art to better understand a measure that the photovoltaic energy storage system provided in this embodiment of this application takes when high-voltage ride-through occurs, the following describes working principles of the energy storage device corresponding to a case in which the energy storage device works properly.

Figure 7:
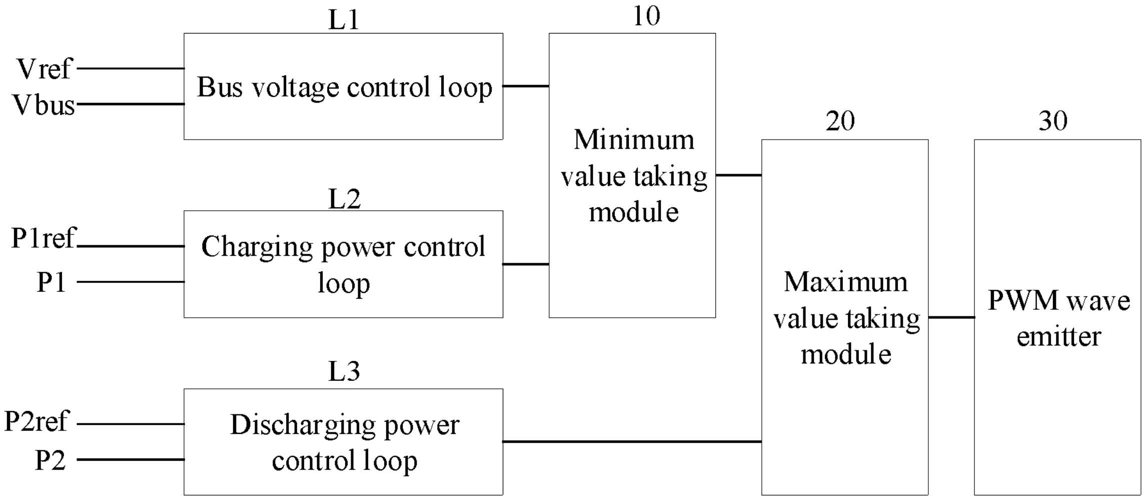
FIG. 7 is a schematic diagram of a control loop according to an embodiment of this application.

FIG. 7 is a schematic diagram of charging and discharging control loops of an energy storage device according to an embodiment of this application.

The inverter may control charging and discharging of the energy storage device. In actual operation, the inverter may send an output voltage reference value Vref, a charging power reference value P1ref, and a discharging power reference value P2ref to the energy storage device using a communication line. The energy storage device may control its charging and discharging based on the output voltage reference value Vref, the charging power reference value P1ref, and the discharging power reference value P2ref.

The following provides descriptions from aspects of the charging working state and the discharging working state.

First Working State: Charging Working State

When Vref<the direct current bus voltage Vbus, the energy storage device absorbs energy from the direct current bus to charge the battery pack. A charging principle is that an actual charging power P1 of the energy storage device is less than or equal to the charging power reference value P1ref. That is, during charging, P1 is not greater than P1ref theoretically.

When P1>P1ref, a minimum value taking module 10 takes a minimum value of a bus voltage control loop L1 and a charging power control loop L2, to limit a charging power P1 of the energy storage device to the charging power reference value P1ref, that is, to limit magnitude of P1.

When Vbus=Vref and P1<P1ref, the energy storage device continues absorbing energy from the direct current bus to maintain a state with Vbus equal to Vref.

Second Working State: Discharging Working State

When Vref>Vbus, the battery pack in the energy storage device discharges electricity to the direct current bus. A discharging principle is that a discharging power P2 is less than or equal to the discharging power reference value P2ref, that is, the discharging power P2 is not greater than the discharging power reference value P2ref.

When P2>P2ref, a maximum value taking module 20 takes a maximum value of a bus voltage control loop L1 and a discharging power control loop L3 (in this case, the charging power loop L2 reaches an upper limit value, and therefore, the bus voltage control loop L1 works after the minimum value taking module 10 takes a minimum value), to limit a discharging power P2 to the discharging power reference value P2ref, that is, to limit magnitude of P2. A final result needs to be output to a PWM wave emitter 30, that is, to control the power conversion circuit to work.

When Vbus=Vref and P2<P2ref, the energy storage device continues discharging electricity to maintain a state with Vbus equal to Vref.

When high-voltage ride-through occurs in the alternating current power grid, the power of the inverter rises. In this case, if the energy storage device is in the discharging working state, the energy storage device can maintain the discharging working state only if the energy storage device raises the bus voltage. Otherwise, excessively high energy of the inverter flows back into the battery pack, and the battery pack cannot maintain the discharging working state. In addition, if the direct current bus voltage is not raised, the inverter cannot control its output current. Further, when high-voltage ride-through occurs, the inverter cannot enable its output current to meet the requirement in the standard, that is, cannot control the grid-tied current to meet the requirement in the standard corresponding to high-voltage ride-through. Specifically, the energy storage device may raise the direct current bus voltage by raising the output voltage reference value, for example, setting the output voltage reference value above the peak voltage of high-voltage ride-through as required in the standard corresponding to the power grid.

If the energy storage device is in the charging working state when high-voltage ride-through occurs in the alternating current power grid, the energy storage device needs to adjust the charging power reference value to the charging power that applies before high-voltage ride-through occurs, that is, set the actual charging power that applies before high-voltage ride-through occurs as the charging power reference value. This is for a purpose of disabling the bus voltage control loop of the energy storage device, so that the inverter controls magnitude of the direct current bus voltage.

Embodiment of a Power System

A photovoltaic energy storage system is described in the foregoing embodiment and is used in the field of photovoltaic power generation. An embodiment of this application further provides a power system. A specific field of application is not limited, provided that there are an inverter and an energy storage device. A source of a power supply at an input end of the inverter is not limited, for example, may be wind power generation or hydroelectric power generation.

Figure 8:
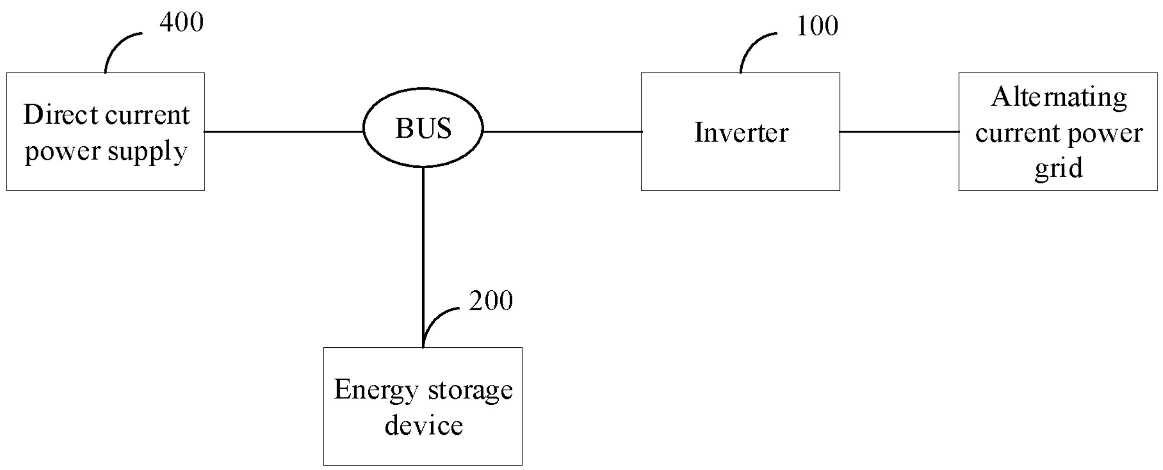
FIG. 8 is a schematic diagram of a power system according to an embodiment of this application.

FIG. 8 is a schematic diagram of a power system according to an embodiment of this application.

The power system provided in this embodiment of this application includes an inverter 100 and an energy storage device 200.

An input end of the inverter 100 is connected to a direct current bus (BUS), and an output end of the inverter 100 is configured to connect to an alternating current power grid.

The energy storage device 200 is connected to the direct current bus (BUS). The direct current bus (BUS) is further configured to connect to a direct current power supply 400. A type of the direct current power supply 400 is not limited in this embodiment of this application. In the foregoing embodiment, an example is used for description in which the direct current power supply is a photovoltaic string. In this embodiment of this application, the direct current power supply 400 may be another type of direct current power supply other than a photovoltaic string.

The inverter 100 is configured to send high-voltage ride-through information to the energy storage device 200 when high-voltage ride-through occurs in the alternating current power grid.

The energy storage device 200 is configured to: when the high-voltage ride-through information is received, adjust an output voltage reference value to maintain a discharging working state if the energy storage device 200 is in the discharging working state, or adjust a charging power reference value to maintain a charging working state if the energy storage device 200 is in the charging working state.

Figure 9:
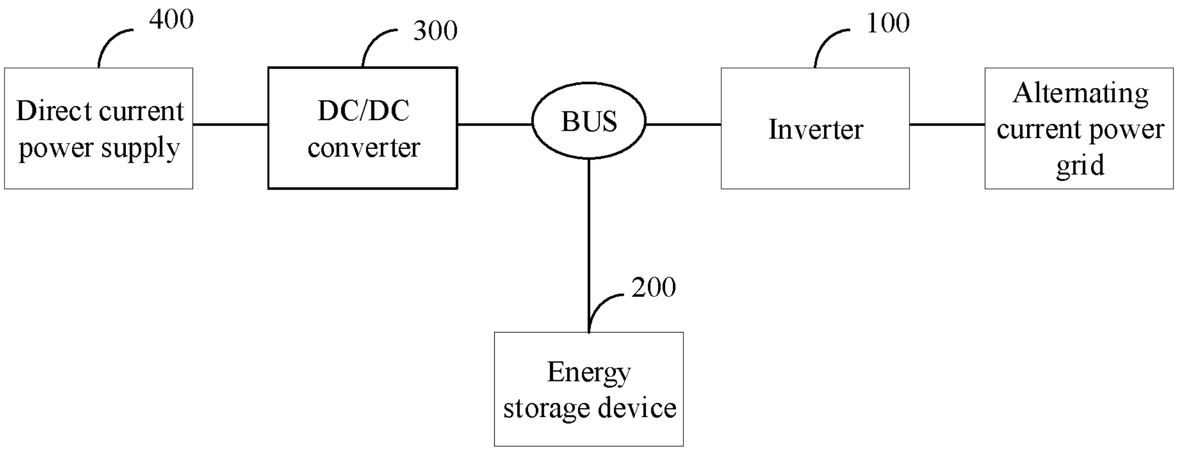
FIG. 9 is a schematic diagram of another power system according to an embodiment of this application.

In a possible implementation, the power system may further include a DC/DC converter 300. As shown in FIG. 9, an input end of the DC/DC converter 300 is connected to the direct current power supply 400, and an output end of the DC/DC converter 300 is connected to the direct current bus (BUS).

In specific implementation, the inverter may encode the high-voltage ride-through information into a pulse signal, and send the pulse signal to a first interface of the energy storage device through an I/O port of the inverter. The pulse signal herein may be a square wave signal or a level signal. This is not specifically limited herein.

To save a hardware interface of the inverter, the inverter may reuse an existing interface to send the high-voltage ride-through information, for example, reuse an interface used to send a power-on signal to the energy storage device. However, to distinguish between the power-on signal and the high-voltage ride-through information more accurately, the energy storage device may identify the high-voltage ride-through information and the power-on signal using two different interfaces, respectively. For example, the inverter sends the power-on signal to a second interface of the energy storage device through the I/O port.

The energy storage device 200 is further configured to power on when receiving the power-on signal. Usually, the inverter 100 first starts up and then controls the energy storage device 200 to power on.

The energy storage device may usually include a controller, a power conversion circuit, and a battery pack. A specific implementation of the battery pack is not limited in this embodiment of this application. For example, the battery pack may include a plurality of battery clusters, each battery cluster including a plurality of battery modules. Usually, the plurality of battery clusters are placed in an energy storage container and connected to the direct current bus via the power conversion circuit.

In specific implementation, a first end of the power conversion circuit is connected to the battery pack, and a second end of the power conversion circuit is connected to the direct current bus.

The controller is configured to: when the high-voltage ride-through information is received and the battery pack is in the discharging working state, control the power conversion circuit to raise the output voltage reference value of the energy storage device above a peak voltage of high-voltage ride-through, so that the energy storage device remains in the discharging working state; and is further configured to: when the high-voltage ride-through information is received and the battery pack is in the charging working state, adjust the charging power reference value of the energy storage device to a charging power that applies before high-voltage ride-through occurs, so that the energy storage device remains in the charging working state.

In this embodiment of this application, the inverter is used to determine whether high-voltage ride-through occurs in the alternating current power grid. When high-voltage ride-through occurs in the alternating current power grid, the inverter needs to notify the energy storage device of occurrence of high-voltage ride-through, so that the energy storage device takes a high-voltage ride-through measure, and further the inverter can control a grid-tied current to meet a requirement that corresponds to high-voltage ride-through. A conventional alternating current power grid does not have an energy storage device. Therefore, when high-voltage ride-through occurs in the alternating current power grid, a working status of an energy storage device does not need to be considered. In contrast, the power system includes both the inverter and the energy storage device. Therefore, when high-voltage ride-through occurs in the alternating current power grid, the energy storage device needs to be notified in a timely manner. If the energy storage device is used to identify high-voltage ride-through, the energy storage device usually determines, based on a direct current bus voltage, whether high-voltage ride-through occurs. However, when high-voltage ride-through occurs in the alternating current power grid, a rise in the direct current bus voltage is related to magnitude of capacitance of the direct current bus. Therefore, based on a rise in the direct current bus voltage, the energy storage device cannot accurately determine whether high-voltage ride-through occurs. In this embodiment of this application, use of the inverter to identify high-voltage ride-through can help more accurately determine a moment at which high-voltage ride-through occurs.

When high-voltage ride-through occurs in the alternating current power grid, a power of the inverter rises. In this case, if the energy storage device is in the discharging working state, the energy storage device can maintain the discharging working state only if the energy storage device raises the bus voltage. Otherwise, excessively high energy of the inverter flows back into the battery pack, and the battery pack cannot maintain the discharging working state. If the direct current bus voltage is not raised, the inverter cannot control its output current. Further, when high-voltage ride-through occurs, the inverter cannot enable its output current to meet a requirement in a standard, that is, cannot control a grid-tied current to meet the requirement in the standard corresponding to high-voltage ride-through. Specifically, the energy storage device may raise the direct current bus voltage by raising the output voltage reference value. If the energy storage device is in the charging working state when high-voltage ride-through occurs, the energy storage device needs to adjust the charging power reference value to the charging power that applies before high-voltage ride-through occurs, that is, set the actual charging power that applies before high-voltage ride-through occurs as the charging power reference value. This is for a purpose of disabling a bus voltage control loop of the energy storage device, so that the inverter controls magnitude of the direct current bus voltage.

For an internal structure of the energy storage device described in this embodiment, refer to the foregoing description of FIG. 5. Details are not described herein again.

The power-on signal and high-voltage ride-through information sent by the inverter to the energy storage device may use the same I/O port. This is described in detail in the foregoing embodiment of a photovoltaic energy storage system. The following only briefly describes a possible implementation.

In a possible implementation, the inverter includes a first optocoupler and a second optocoupler. An input terminal of the first optocoupler is connected to the I/O port of the inverter. An output terminal of the first optocoupler is connected to the first interface of the energy storage device. An input terminal of the second optocoupler is connected to the I/O port of the inverter. An output terminal of the second optocoupler is connected to the second interface of the energy storage device. For specific working principles, refer to the foregoing description of FIG. 6. Details are not described herein again.

Method Embodiment

Based on the photovoltaic energy storage system and the power system provided in the foregoing embodiments, an embodiment of this application further provides a high-voltage ride-through control method. The following describes the high-voltage ride-through control method in detail with reference to an accompanying drawing.

Figure 10:
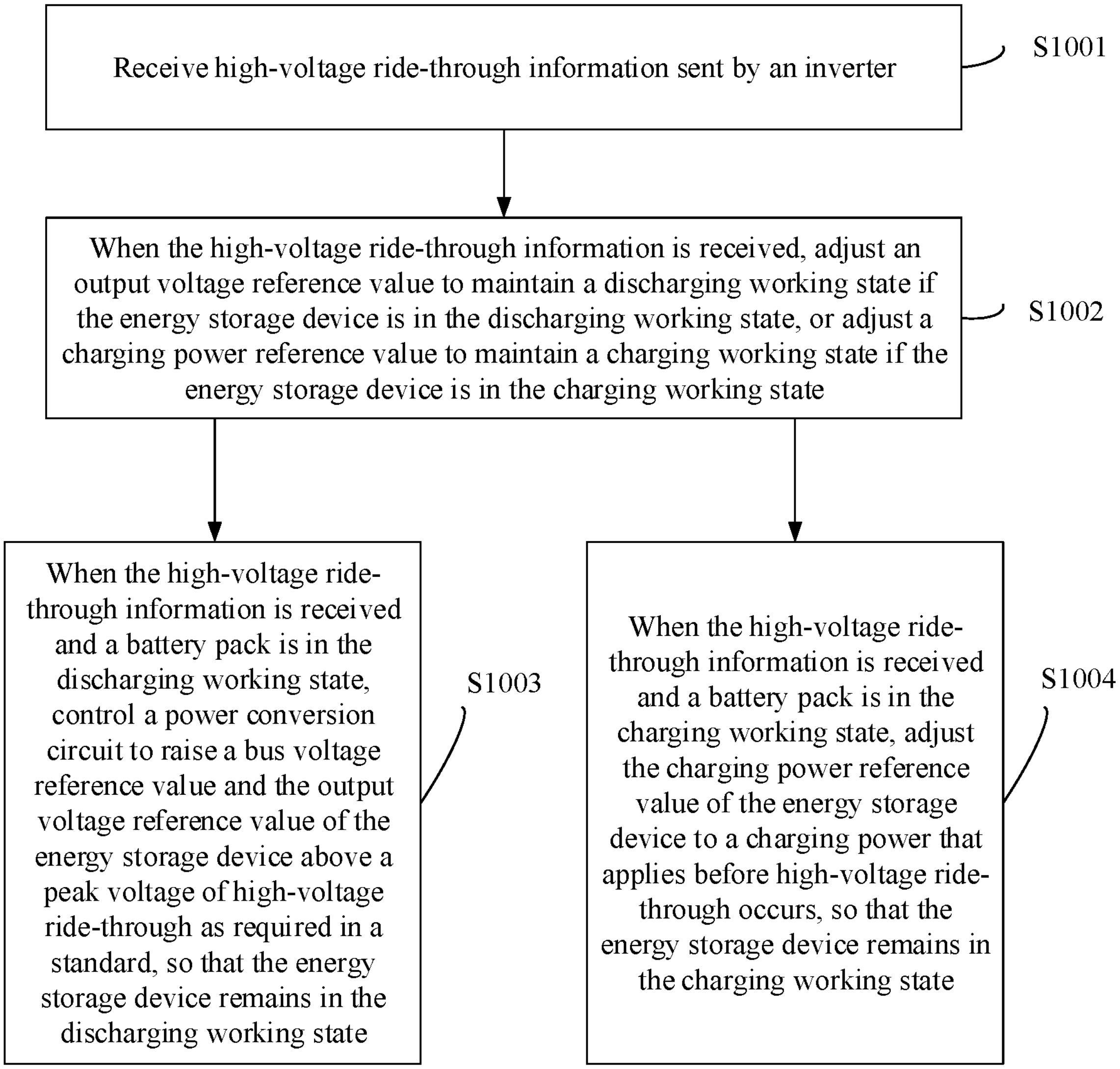
FIG. 10 is a flowchart of a high-voltage ride-through control method according to an embodiment of this application.

FIG. 10 is a flowchart of a high-voltage ride-through control method according to an embodiment of this application.

The high-voltage ride-through control method provided in this embodiment is applied to a photovoltaic energy storage system. The photovoltaic energy storage system includes an inverter and an energy storage device. An input end of the inverter is configured to connect to a direct current bus. The energy storage device is configured to connect to the direct current bus. An output end of the inverter is configured to connect to an alternating current power grid.

The method includes the following steps.

S1001: Receive high-voltage ride-through information sent by the inverter, where the inverter is configured to determine, based in the alternating current power grid, whether high-voltage ride-through occurs, and when determining that high-voltage ride-through occurs, the inverter sends the high-voltage ride-through information to the energy storage device, that is, notifies the energy storage device of occurrence of high-voltage ride-through.

S1002: When the high-voltage ride-through information is received, adjust an output voltage reference value to maintain a discharging working state if the energy storage device is in the discharging working state, or adjust a charging power reference value to maintain a charging working state if the energy storage device is in the charging working state.

When performing high-voltage ride-through, the energy storage device may take a corresponding measure based on its working status. Specifically, there are the following two cases.

First case: The energy storage device is in the discharging working state.

S1003: When the high-voltage ride-through information is received and a battery pack is in the discharging working state, control a power conversion circuit to raise the output voltage reference value of the energy storage device above a peak voltage of high-voltage ride-through as required in a standard, so that the energy storage device remains in the discharging working state.

When high-voltage ride-through occurs in the alternating current power grid, a power of the inverter rises. In this case, if the energy storage device is in the discharging working state, the energy storage device can maintain the discharging working state only if the energy storage device raises a bus voltage. Otherwise, excessively high energy of the inverter flows back into the battery pack, and the battery pack cannot maintain the discharging working state. If the direct current bus voltage is not raised, the inverter cannot control its output current. Further, when high-voltage ride-through occurs, the inverter cannot enable its output current to meet a requirement in the standard, that is, cannot control a grid-tied current to meet the requirement in the standard corresponding to high-voltage ride-through. Specifically, the energy storage device may raise the direct current bus voltage by raising the output voltage reference value.

Second case: The energy storage device is in the charging working state.

S1004: When the high-voltage ride-through information is received and a battery pack is in the charging working state, adjust the charging power reference value of the energy storage device to a charging power that applies before high-voltage ride-through occurs, so that the energy storage device remains in the charging working state.

When high-voltage ride-through occurs, the energy storage device may take a corresponding measure based on its working status. For example, when being in the discharging working state, the energy storage device may raise the direct current bus voltage quickly to maintain the discharging working state. This avoids a case in which a current flows back into the energy storage device due to the quite high direct current bus voltage and the battery pack in the energy storage device is consequently charged. The energy storage device raises the direct current bus voltage for the following purposes: to enable the energy storage device to maintain the discharging working state and not to frequently switch between the discharging working state and the charging working state, and to enable the inverter to output a power according to the requirement in the standard when high-voltage ride-through occurs. Specifically, the energy storage device may indirectly raise the direct current bus voltage by raising an output voltage. In addition, if the energy storage device is in the charging working state when high-voltage ride-through occurs, the charging power reference value of the energy storage device needs to be adjusted, so that the energy storage device maintains the charging working state. If the energy storage device changes the working status when high-voltage ride-through occurs in the alternating current power grid, it affects the inverter controlling the grid-tied current, resulting in failure to smoothly undergo high-voltage ride-through. In addition, normal operation of the energy storage device and the inverter is affected, and in a worst case, damage to a hardware device may be caused.

In the photovoltaic energy storage system provided in this embodiment of this application, the inverter is used to determine whether high-voltage ride-through occurs in the alternating current power grid. When high-voltage ride-through occurs in the alternating current power grid, the inverter sends the high-voltage ride-through information to the energy storage device to notify the energy storage device of occurrence of high-voltage ride-through, so that the energy storage device takes a corresponding measure based on its working status. If being in the discharging working state, the energy storage device adjusts the output voltage reference value to maintain the discharging working state. If being in the charging working state, the energy storage device adjusts the charging power reference value to maintain the charging working state. In this embodiment of this application, a manner is not used in which the energy storage device is used to identify high-voltage ride-through and then takes a corresponding measure. This is because the energy storage device cannot accurately determine whether high-voltage ride-through occurs. If high-voltage ride-through occurs but the energy storage device fails to identify it in a timely manner, a high voltage charges the energy storage device in a form of a pulsating current. As a result, the inverter cannot precisely control the grid-tied current, and cannot meet a grid tying requirement of the alternating current power grid.

It should be understood that in this application, "at least one (one item)" means one or more and "a plurality of" means two or more. "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates that the associated objects are in an "or" relationship. "at least one item (one) of the following" or a similar expression thereof indicates any combination of these items, including a single item (one) or any combination of a plurality of items (ones). For example, "at least one of a, b, or c" may indicate a, b, c, "a and b", "a and c", "b and c", or "a, b, and c", where a, b, and c may be singular or plural.

In conclusion, the foregoing embodiments are merely intended for describing the technical solutions of this application other than limiting the technical solutions of this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A photovoltaic energy storage system, comprising an inverter and an energy storage device, wherein an input end of the inverter is configured to connect to a direct current bus, an output end of the inverter is configured to connect to an alternating current power grid, and the direct current bus is configured to connect to a photovoltaic string;

the energy storage device is configured to connect to the direct current bus;

the inverter is configured to send high-voltage ride-through information to the energy storage device when a high-voltage ride-through occurs in the alternating current power grid; and the energy storage device is configured to: when the high-voltage ride-through information is received, adjust an output voltage reference value to maintain a discharging working state in response to the energy storage device being in the discharging working state, or adjust a charging power reference value to maintain a charging working state in response to the energy storage device being in the charging working state.

2. The photovoltaic energy storage system according to claim 1, wherein the energy storage device comprises a controller, a power conversion circuit, and a battery pack, and wherein:

a first end of the power conversion circuit is connected to the battery pack, and a second end of the power conversion circuit is connected to the direct current bus; and the controller is configured to:

when the high-voltage ride-through information is received and the battery pack is in the discharging working state, control the energy storage device to output an energy to the direct current bus, and control the power conversion circuit to raise the output voltage reference value of the energy storage device above a peak voltage of the high-voltage ride-through, wherein the energy storage device remains in the discharging working state; and when the high-voltage ride-through information is received and the battery pack is in the charging working state, adjust the charging power reference value of the energy storage device to a charging power that applies before the high-voltage ride-through occurs, wherein the energy storage device remains in the charging working state.

3. The photovoltaic energy storage system according to claim 1, wherein the inverter is configured to;

encode the high-voltage ride-through information into a pulse signal, and send the pulse signal to a first interface of the energy storage device through an input/output (I/O) port of the inverter.

4. The photovoltaic energy storage system according to claim 3, further comprising an energy storage drive circuit, wherein the inverter is further configured to send a power-on signal to a first interface of the energy storage drive circuit through the I/O port; and the energy storage drive circuit is configured to drive the energy storage device to power on when the power-on signal is received.

5. The photovoltaic energy storage system according to claim 4, wherein the inverter comprises a first optocoupler and a second optocoupler;

a first input terminal of the first optocoupler is connected to the I/O port of the inverter, a first output terminal of the first optocoupler is connected to a power supply, and a second output terminal of the first optocoupler is connected to the first interface of the energy storage device;

a first input terminal of the second optocoupler is connected to the I/O port of the inverter, and an output terminal of the second optocoupler is connected to the first interface of the energy storage drive circuit; and a second input terminal of the first optocoupler and a second input terminal of the second optocoupler are both connected to a reference ground.

6. The photovoltaic energy storage system according to claim 1, further comprising a direct current/direct current converter, wherein an input end of the direct current/direct current converter is configured to connect to the photovoltaic string, and an output end of the direct current/direct current converter is configured to connect to the direct current bus.

7. The photovoltaic energy storage system according to claim 2, wherein the controller is configured to control the output voltage reference value of the power conversion circuit to be a preset multiple of a rated voltage of the alternating current power grid, with a value interval of the preset multiple greater than 1.4 and less than 2.

8. A power system, comprising an inverter and an energy storage device, wherein;

an input end of the inverter is connected to a direct current bus, and an output end of the inverter is configured to connect to an alternating current power grid;

the energy storage device is connected to the direct current bus;

the inverter is configured to send high-voltage ride-through information to the energy storage device when a high-voltage ride-through occurs in the alternating current power grid; and the energy storage device is configured to: when the high-voltage ride-through information is received, adjust an output voltage reference value to maintain a discharging working state in response to the energy storage device being in the discharging working state, or adjust a charging power reference value to maintain a charging working state in response to the energy storage device being in the charging working state.

9. The power system according to claim 8, wherein the inverter is configured to:

encode the high-voltage ride-through information into a pulse signal, and send the pulse signal to a first interface of the energy storage device through an input/output (I/O) port of the inverter.

10. The power system according to claim 9, wherein the inverter is further configured to send a power-on signal to a second interface of the energy storage device through the I/O port; and the energy storage device is configured to power on when receiving the power-on signal.

11. The power system according to claim 8, wherein the energy storage device comprises a controller, a power conversion circuit, and a battery pack, and wherein:

a first end of the power conversion circuit is connected to the battery pack, and a second end of the power conversion circuit is connected to the direct current bus; and the controller is configured to:

when the high-voltage ride-through information is received and the battery pack is in the discharging working state, control the power conversion circuit to raise the output voltage reference value of the energy storage device above a peak voltage of the high-voltage ride-through, wherein the energy storage device remains in the discharging working state; and when the high-voltage ride-through information is received and the battery pack is in the charging working state, adjust the charging power reference value of the energy storage device to a charging power that applies before the high-voltage ride-through occurs, wherein the energy storage device remains in the charging working state.

12. The power system according to claim 10, wherein the inverter comprises a first optocoupler and a second optocoupler;

a first input terminal of the first optocoupler is connected to the I/O port of the inverter, a first output terminal of the first optocoupler is connected to a power supply, and a second output terminal of the first optocoupler is connected to the first interface of the energy storage device;

a first input terminal of the second optocoupler is connected to the I/O port of the inverter, and an output terminal of the second optocoupler is connected to the first interface of the energy storage device; and a second input terminal of the first optocoupler and a second input terminal of the second optocoupler are both connected to a reference ground.

13. A high-voltage ride-through control method, applied to a photovoltaic energy storage system, wherein:

the photovoltaic energy storage system comprises an inverter and an energy storage device, an input end of the inverter is configured to connect to a direct current bus, the energy storage device is configured to connect to the direct current bus, and an output end of the inverter is configured to connect to an alternating current power grid; and the high-voltage ride-through control method comprises:

receiving high-voltage ride-through information sent by the inverter, wherein the inverter is configured to determine whether a high-voltage ride-through occurs in the alternating current power grid; and when the high-voltage ride-through information is received, adjusting an output voltage reference value to maintain a discharging working state in response to the energy storage device being in the discharging working state, or adjusting a charging power reference value to maintain a charging working state in response to the energy storage device being in the charging working state.

14. The high-voltage ride-through control method according to claim 13, wherein the when the high-voltage ride-through information is received, adjusting an output voltage reference value to maintain a discharging working state in response to the energy storage device being in the discharging working state, or adjusting a charging power reference value to maintain a charging working state in response to the energy storage device being in the charging working state, comprises:

when the high-voltage ride-through information is received and a battery pack is in the discharging working state, controlling a power conversion circuit to raise the output voltage reference value of the energy storage device above a peak voltage of the high-voltage ride-through, wherein the energy storage device remains in the discharging working state; or when the high-voltage ride-through information is received and a battery pack is in the charging working state, adjusting the charging power reference value of the energy storage device to a charging power that applies before the high-voltage ride-through occurs, wherein the energy storage device remains in the charging working state.

* * * * *